United States Patent
Clark et al.

(10) Patent No.: US 10,427,519 B2
(45) Date of Patent: Oct. 1, 2019

(54) INSULATED TANK

(71) Applicant: Deere and Company, Moline, IL (US)

(72) Inventors: Scott N. Clark, Davenport, IA (US); Kenneth J. Carter, Platteville, WI (US); Steven T. Rieck, Cambridge, IL (US)

(73) Assignee: Deere & Company, Moline, IL (US)

( * ) Notice: Subject to any disclaimer, the term of this patent is extended or adjusted under 35 U.S.C. 154(b) by 929 days.

(21) Appl. No.: 14/530,629

(22) Filed: Oct. 31, 2014

(65) Prior Publication Data

US 2016/0121717 A1    May 5, 2016

(51) Int. Cl.
*B60K 15/03*  (2006.01)
*B60K 15/073*  (2006.01)

(52) U.S. Cl.
CPC ............ *B60K 15/073* (2013.01); *B60K 15/03* (2013.01); *B60K 15/03177* (2013.01); *B60K 2015/03032* (2013.01); *B60K 2015/03059* (2013.01); *B60K 2015/03421* (2013.01); *B60K 2015/03493* (2013.01)

(58) Field of Classification Search
CPC .......................... B60K 15/03; B60K 15/03177
USPC ........................ 220/592.24, 592.26, 560.14
See application file for complete search history.

(56) References Cited

U.S. PATENT DOCUMENTS

| | | | |
|---|---|---|---|
| 1,580,413 A * | 4/1926 | Cover | B01J 19/0053 217/128 |
| 1,685,111 A * | 9/1928 | Willoughby | B61D 5/04 220/562 |
| 1,727,684 A * | 9/1929 | Willoughby | B61D 5/04 220/562 |
| 2,853,871 A | 9/1958 | Compton | |
| 3,067,829 A | 12/1962 | Klemm | |
| 3,521,604 A * | 7/1970 | Nickel | B29C 44/0407 122/19.2 |
| 3,669,299 A * | 6/1972 | Jones | B65D 81/022 220/23.87 |
| 4,000,826 A | 1/1977 | Rogers | |
| 4,909,530 A | 3/1990 | Tsukada | |
| 5,194,212 A | 3/1993 | Bonnett | |
| 5,674,603 A | 10/1997 | Stiles et al. | |
| 6,138,861 A * | 10/2000 | Palazzo | B29C 47/0019 156/187 |
| 6,380,523 B1 * | 4/2002 | Jones, Sr. | H05B 3/36 219/212 |
| 6,395,357 B1 | 5/2002 | Abu-Isa | |
| 6,401,961 B1 | 6/2002 | Butler | |

(Continued)

FOREIGN PATENT DOCUMENTS

DE  102011113845 A1 *  3/2013  ............. B29C 49/04
JP       08011556 A  *  1/1996

(Continued)

OTHER PUBLICATIONS

European Search Report dated Mar. 22, 2016.
European Search Report for 15186276.0-1752 dated Apr. 21, 2016.

*Primary Examiner* — Joseph M Rocca
*Assistant Examiner* — Daniel S Yeagley
(74) *Attorney, Agent, or Firm* — Rathe Lindenbaum LLP

(57) ABSTRACT

An apparatus includes a tank having an outer surface, and panels of insulative material. The panels positioned over substantially the entire outer surface of the tank and extend adjacent to one another to form seams.

21 Claims, 11 Drawing Sheets

(56) References Cited

U.S. PATENT DOCUMENTS

| | | | |
|---|---|---|---|
| 6,418,962 B1 * | 7/2002 | Wozniak | B60K 15/013 137/266 |
| 7,264,277 B2 | 9/2007 | Ono et al. | |
| 7,270,209 B2 * | 9/2007 | Suess | B60K 15/03006 180/69.5 |
| 8,015,634 B1 * | 9/2011 | Lessard | E03D 1/006 220/4.06 |
| 8,381,928 B2 * | 2/2013 | Burrington | B60K 15/03177 156/322 |
| 8,579,062 B2 * | 11/2013 | Niewoehner | B60K 15/03177 180/69.4 |
| 8,771,819 B2 * | 7/2014 | Eaton | B44C 5/04 150/154 |
| 2002/0053568 A1 | 5/2002 | Balzer et al. | |
| 2003/0096457 A1 * | 5/2003 | Gottschalk | B08B 3/12 438/142 |
| 2004/0200356 A1 | 10/2004 | Kuperius | |
| 2007/0254172 A1 * | 11/2007 | Kanazawa | B60K 15/03177 428/461 |
| 2008/0017430 A1 | 1/2008 | Marsala | |
| 2013/0097951 A1 | 4/2013 | Chism | |
| 2013/0264347 A1 | 10/2013 | Fujita | |
| 2013/0277372 A1 | 10/2013 | Waku | |
| 2014/0326732 A1 * | 11/2014 | Hutzen | B29C 49/04 220/562 |

FOREIGN PATENT DOCUMENTS

| | | |
|---|---|---|
| JP | 2004203094 | 7/2004 |
| JP | 2009078723 A * | 4/2009 |
| JP | 2011068208 A * | 4/2011 |
| WO | WO2013006942 | 1/2013 |
| WO | WO20140147138 | 9/2014 |

\* cited by examiner

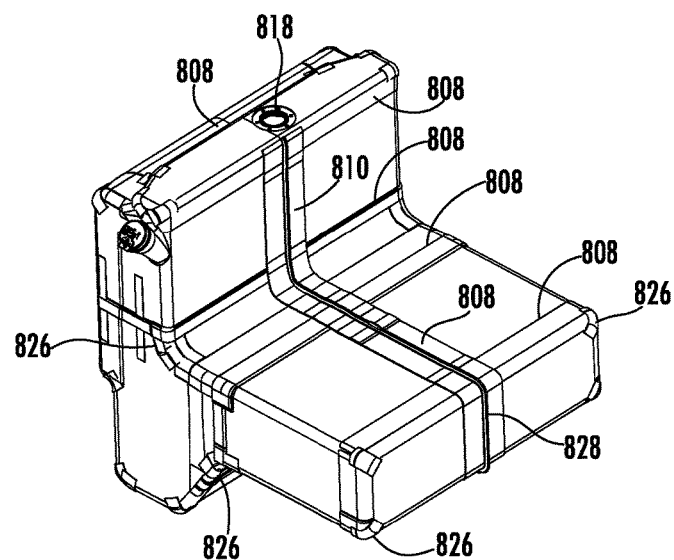
FIG. 8B
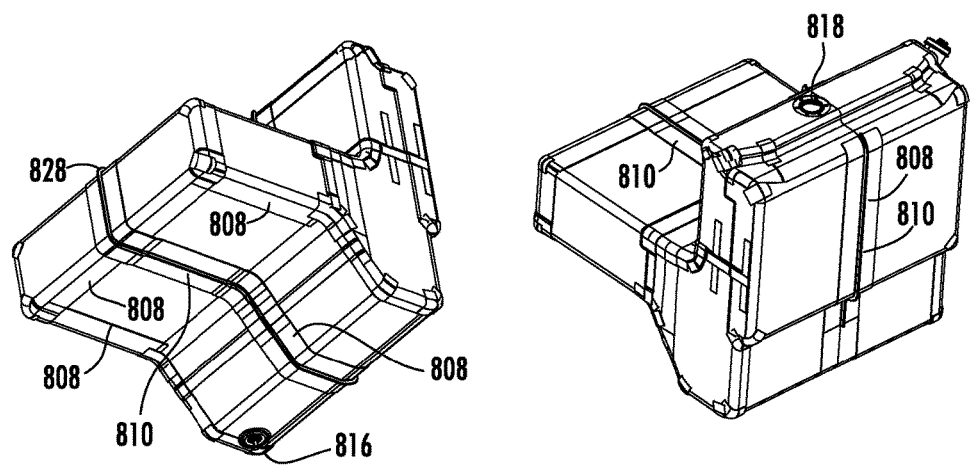
FIG. 8C
FIG. 8D

INSULATED TANK

BACKGROUND

Vehicles typically include tanks for carrying quantities of fluids needed for their operation. For example, a typical harvester may include a tank for carrying a supply of diesel fuel used to operate a diesel engine. Even in larger vehicles such as harvesters, however, space for onboard fluid tanks is often limited by the other system components. As such, complex tank geometries are often desired in order to maximize tank capacity in a given space. Plastic tanks are often used, owing to the more complex yet economical geometries they provide. Plastic tanks, however, are often exposed to heat sources and combustible materials, such as high temperature vehicle components and hot fluids, as well as debris and other materials which may compromise their integrity. Plastic tanks are also susceptible to expansion due to, for example, hydrostatic pressure and permeation from the fluids they contain, as well as thermal expansion and fluid sloshing caused by external components and vehicle dynamics. Some vehicles include partial coverings, such as formed heat shields, to protect the integrity of their fuel tanks. Partial coverings, however, provide only partial protection from heat sources and harmful materials. Formed heat shields are overly complex to install, are not conducive to covering tanks having complex geometries, and may allow debris and other materials to infiltrate the area between the heat shield and tank.

BRIEF DESCRIPTION OF THE DRAWINGS

FIG. 8B is a perspective view of the insulated tank assembly of FIG. 8A.

FIG. 8C is another perspective view of the insulated tank assembly of FIG. 8A.

FIG. 8D is yet another perspective view of the insulated tank assembly of FIG. 8A.

DETAILED DESCRIPTION

Figure 1A:
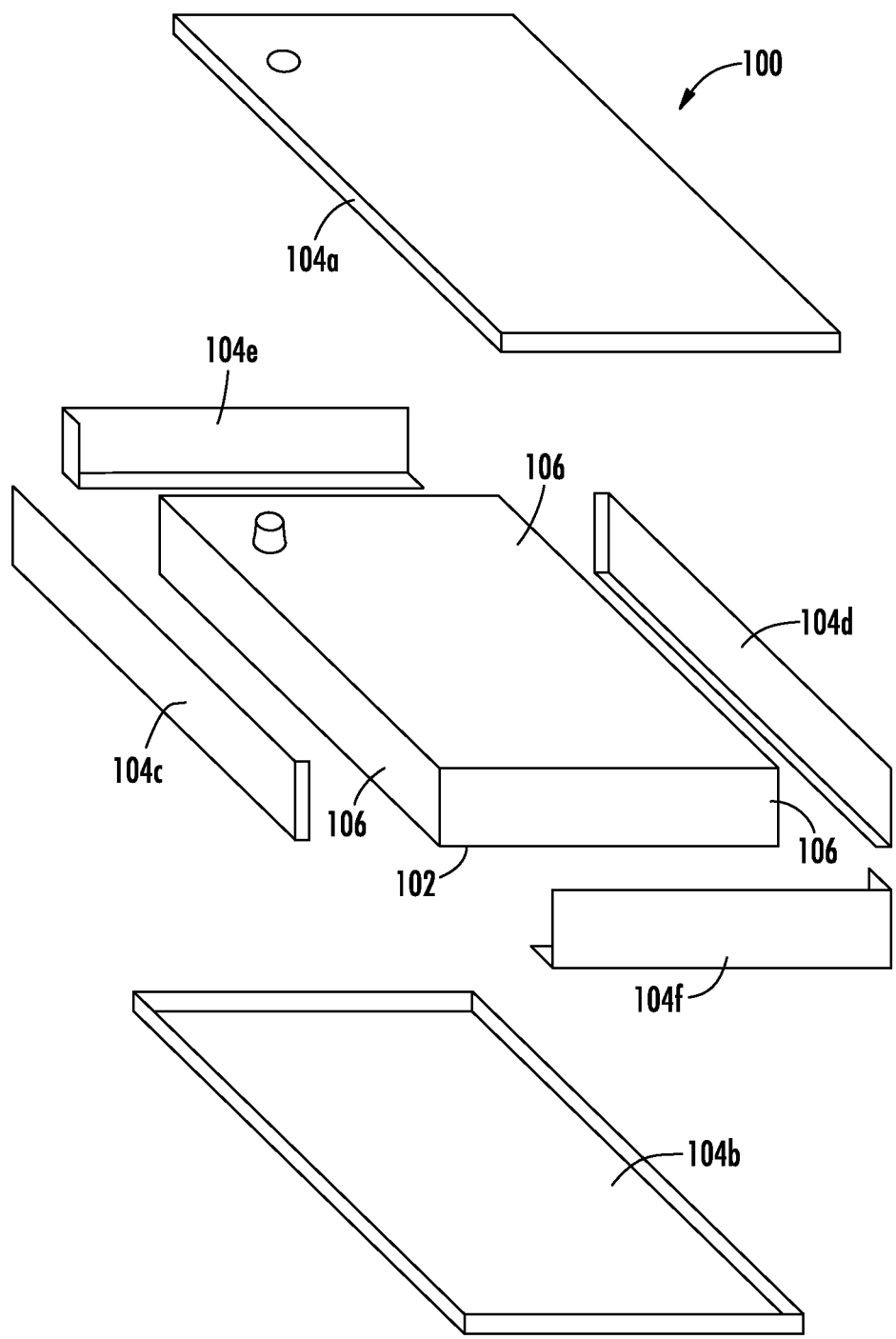
FIG. 1A is an exploded view of an example insulated tank assembly.
Figure 1B:
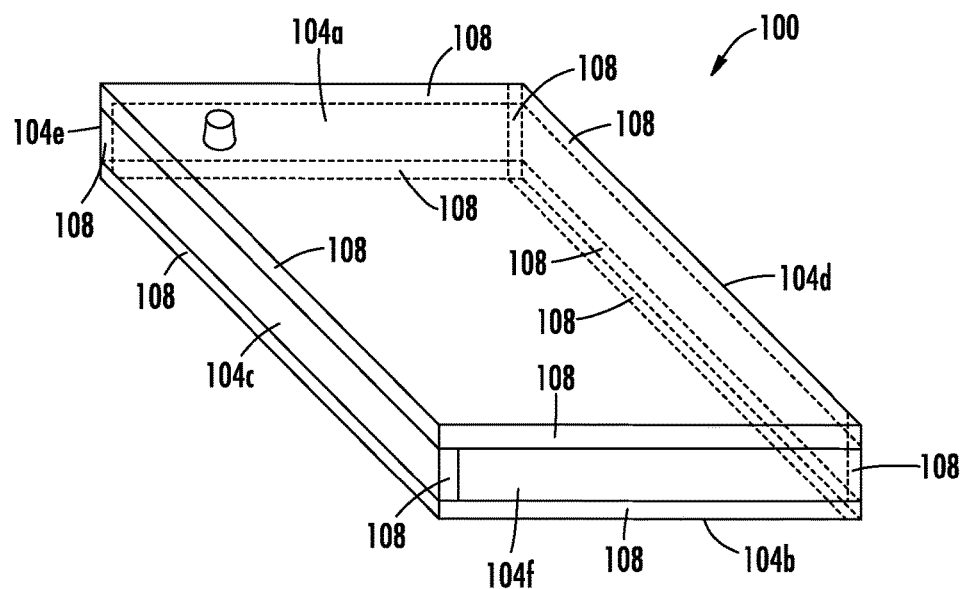
FIG. 1B is a perspective view of the example insulated tank assembly of FIG. 1A.

FIGS. 1A and 1B illustrate different views of an example insulated tank assembly 100. In particular, FIG. 1A is an exploded view of insulated tank assembly 100, and FIG. 1B is a perspective view of insulated tank assembly 100. As shown in FIG. 1A, insulated tank assembly 100 may include a tank 102 and panels 104. Tank 102 may be, for example, a work vehicle tank used to carry quantities of fluids used during operation of the work vehicle. For purposes of this description, tank 102 will often be described in the context of a harvester, but it should be understood that other vehicles are contemplated as well.

Tank 102 may contain any type of fluid. For example, in the context of a harvester, tank 102 may carry diesel fuel, gasoline, hydraulic fluid, coolant, etc. For purposes of this description, tank 102 will often be described in the context of a diesel fuel tank, but it should be understood that other fluids are contemplated as well. Tank 102 may have any suitable fluid capacity depending on the particular application. For example, tank 102 may be a 950 liter harvester fuel tank. Tank 102 may include an opening and other surrounding structure, such as a fill neck, for permitting fluids to enter. Tank 102 may also include openings to accommodate vents, drain valves, sending units and return lines for sensing fuel levels, etc.

Tank 102 may be made of any sufficiently rigid material depending on the particular application, such as metal or plastic, or compounds and synthetics based thereon. For purposes of this description, tank 102 will often be described in the context of a plastic tank, but it should be understood that other materials are contemplated as well. Tank 102 may be formed and shaped in any suitable manner. For example, tank 102 may be molded, cast, machined, assembled from castings, stampings, or cutouts, formed from sheet materials, etc.

Tank 102 may have walls forming an outer surface 106 based on any suitable geometry depending on the particular application. For example, as shown in FIG. 1, tank 102 may generally have the geometry of a hollow rectangular prism. In some examples, such as harvester fuel tanks, tank 102 may have more complex geometries to accommodate surrounding structure and components, as well as to allow for expansion of fluids or vapor (e.g., diesel fuel vapor) inside tank 102. In such examples, tank 102 may be made from plastic in order to facilitate such complex geometries. In some examples, tank 102 may have rounded or chamfered edges to facilitate a plastic molding process. In some examples, tank 102 may have walls of uniform or varying thicknesses, internal or external ribs, or other structures designed (e.g., using a finite element analysis) to strengthen tank 102 and minimize tank expansion. In some examples, outer surface 106 may be designed to simply positioning of panels 104. For example, outer surface 106 may be designed to minimize complex intersections planes and protrusions so that a minimum number of panels 104 having simplified shapes may be used to cover the surface of tank 102.

Panels 104 may be made of any insulative material suitable for protecting tank 102 from heat sources and combustible materials. For example, panels 104 may be made from a thermally insulative material that may be made to conform to outer surface 106 such that no gaps or spaces exist between panels 104 and outer surface 106. Exemplary insulative materials may include, for example, fiberglass, polyethylene terephthalate, or other insulative materials or combinations thereof. In some examples, panels 104 may be multilayered in structure. For example, panels 104 may include a protective layer composed of a heat shielding material, such as foils and/or sheets made of aluminum or another metal, alloy or other durable material. In some examples, panels 104 may include a layer of adhesive material to hold panels 104 in position over outer surface 106. In some examples, the adhesive may be an adhesive such as HPA1905 that may provide resistance to fuels, hydraulic oil, engine oil, solvents, etc.

Figure 2:
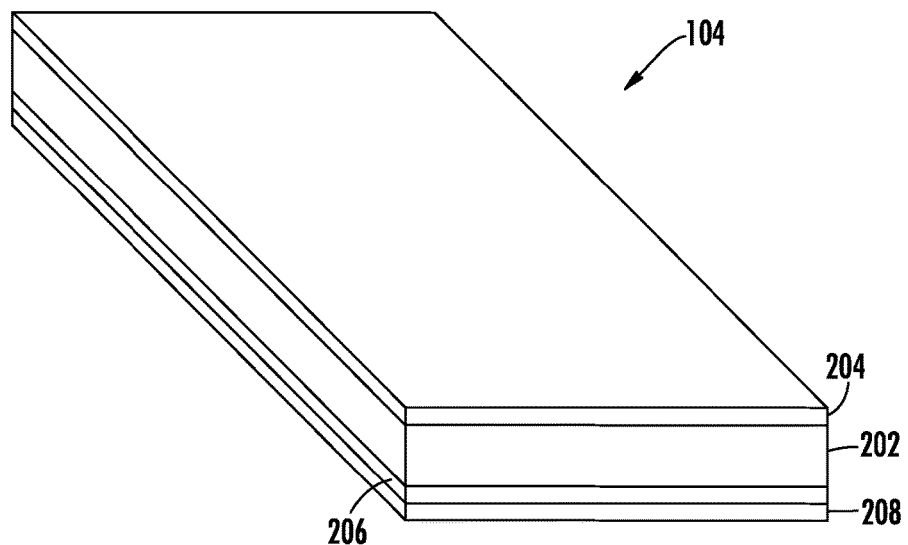
FIG. 2 is a perspective view of an example panel that may be used in the insulated tank assembly of FIGS. 1A and 1B.

FIG. 2 illustrates an example of a panel 104, which may be used in fuel tank assembly 100. As shown in FIG. 2, panel 104 may include a layer 202, a layer 204, and a layer 206. In some examples, layer 202 may be a thermally insulative material, layer 204 may be a protective layer composed of a heat shielding material, and layer 206 may be a layer of adhesive. Layers 202, 204, and 206 may be positioned such that when panel 104 is positioned over outer surface 106 of fuel tank assembly 100, layer 202 forms an inner core of thermally insulative material, layer 204 forms an outer layer of heat shielding material, and layer 206 forms a layer of adhesive between panel 104 and outer surface 106 of tank 102. Layers 202, 204, and 206 may be of any suitable thickness depending on the particular example. For example, layer 202 may be a thermally insulative material having a thickness of approximately 5 millimeters with a 10 mil protective layer, layer 204 may be a protective layer composed of a heat shielding material having a thickness of approximately 5 millimeters with a 2 mil protective layer, and layer 206 may be a layer of adhesive having a thickness of approximately 5 millimeters with a 10 mil protective layer.

In some examples, layers 202, 204, and 206 may be bonded together as a single unit. For example, layers 202, 204, and 206 may be bonded together to form sheets or rolls from which individual panels 104 may be formed. In some examples, panel 104 may include a releasable liner 208 to cover layer 206 such that the adhesive is protected until releasable liner 208 is removed. In some examples, layers 202, 204 and 206 may be separate layers that are separately positioned over outer surface 106 of fuel tank assembly 100. In some examples, layers 202 and 204 may be bonded together to form panel 104, and layer 206 may be a layer of adhesive that is separately applied to outer surface 106 of tank 102.

Referring again to FIG. 1, panels 104 may be any suitable sizes and shapes depending on the particular geometry of tank 102. In some examples, panels 104 may be designed to be different sizes and shapes such that, when positioned over outer surface 106 of tank 102, panels 104 cover substantially the entire outer surface of tank 102 with minimal gaps and/or spaces between panels 104 and outer surface 106 of tank 102. The term substantially as used with regard to the entirety of outer surface is intended to indicate that, in some examples, certain minimal portions of outer surface 106 may be exposed (e.g., not covered by panels 104) without compromising the integrity of the protection provided by panels 104. For example, tank 102 may include surfaces and/or structures such as a fill neck and/or other surfaces or structures designed to accommodate openings for vents, sending units and return lines for sensing fuel levels, etc. which may need to remain accessible. In some examples, such surfaces and/or structure may remain minimally exposed. In some examples, other minimal surfaces and/or structures of tank 102 may remain exposed.

Any suitable number of panels 104 may be used in insulated fuel tank assembly 100 to cover outer surface 106 of tank 102. In some examples, a minimum number of panels 104 are used to reduce complexity. For example, while 6 panels 104 (panels 104a, 104b, 104c, 104d, 104e, and 104f) are shown in FIG. 1, the panels 104 may be consolidated into 1, 2, 3, 4, or 5 panels of suitable sizes and shapes to cover the same amount of area of outer surface 106. Similarly, panels 104 shown in FIG. 1 may be subdivided into a greater number of panels to cover outer surface 106.

Panels 104 may be positioned over outer surface 106 of tank 102 such that they extend adjacent to one another to form seams 108. As shown in FIG. 1B, seams 108 may be formed by overlapping surfaces of adjacent panels 104. For example, panels 104a and 104b may overlap panels 104c, 104d, 104e, and 104f to create multiple seams 108. Similarly, panels 104c, 104d, 104e, and 104f may overlap with each other as shown in FIG. 1B to form seams 108. In some examples, seams 108 may be formed by a minimum overlap of approximately 25 millimeters.

Figure 3:
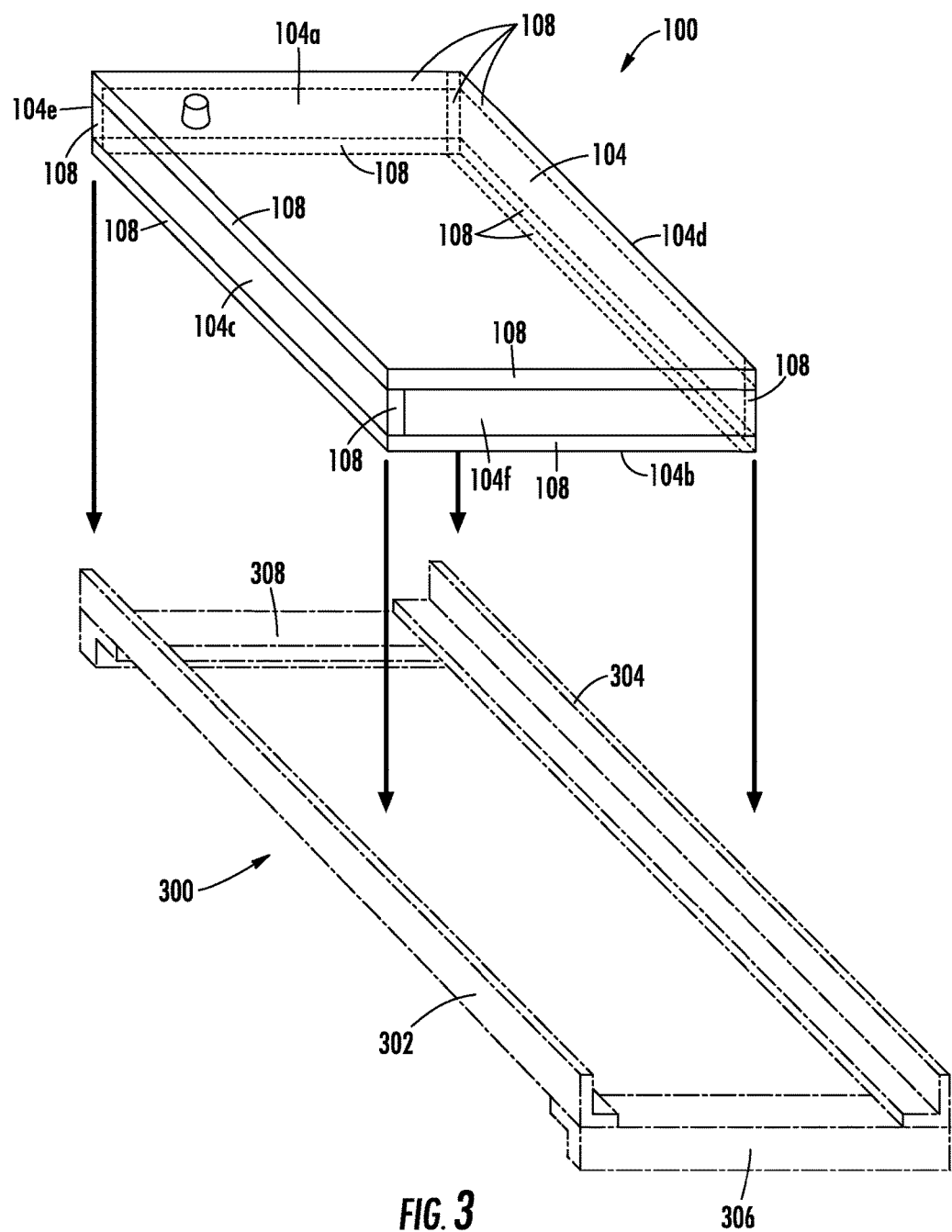
FIG. 3 is perspective view of the example insulated tank assembly of FIGS. 1A and 1B shown with respect to a support structure.

In some examples, panels 104 may be positioned such that, upon location of insulated tank assembly 100 on a support structure, at least one of seams 108 is in contact with the support structure along the length of the seam 108 to prevent separation of the adjacent panels 104 forming the seam. For example, FIG. 3 is perspective view of insulated tank assembly 100 shown with respect to a support structure 300 having rails 302 and 304 and cross members 306 and 308. Upon location of insulated tank assembly 100 on support structure 300, a seam 108 formed along adjacent panels 104b and 104c may be in contact with rail 302 along the length of seam 108. Similarly, a seam 108 formed along adjacent panels 104b and 104d may be in contact with rail 304. The weight of insulated tank assembly 100 resting upon rails 302 and 304 may prevent the respective seams 108 formed by panels 104b and 104c and by panels 104b and 104d from separating. Rails 302 and 304 may also cooperate with cross members 306 and 308 to prevent and/or redirect expansion of tank 102 in areas along the respective seams 108 formed by panels 104b and 104c and by panels 104b and 104d. In some examples, additional support structure may be implemented to contact additional seams 108 to prevent separation, and/or to prevent or redirect expansion of tank 102.

In some examples, patches of an insulative material may be adhered over seams 108 to provide additional protection. For example, patches of an insulative material may be used to protect seams 108 formed adjacent to complex geometric features of tank 102. In some examples, patches of insulative material may be adhered over seams 108 forming a corner or other intersections of seams 108. The patches may be, for example, patches of thermally insulative tape. In some examples, patches of an insulative material having an adhesive surface, an insulative core, and a layer of heat shielding material, and having an overall thickness of approximately 5 milllimeters may be used. The adhesive surface may be protected by a releasable liner that may be removed to expose the adhesive.

Figure 4:
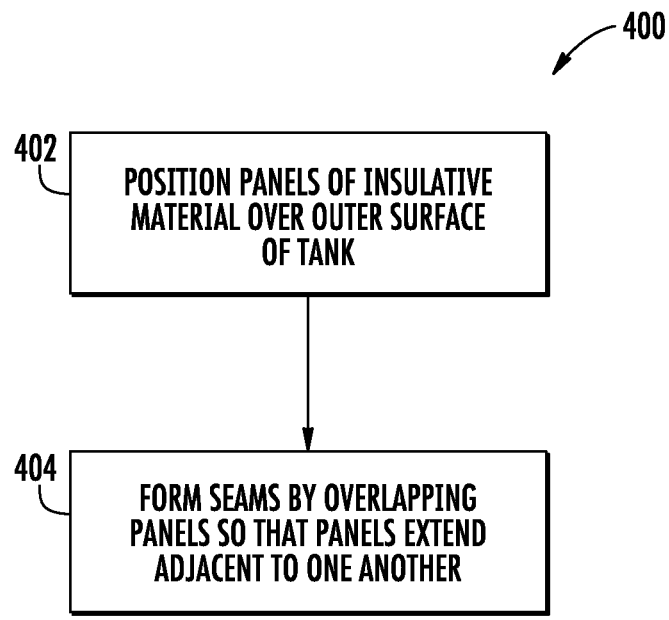
FIG. 4 is a flow diagram of an example method of assembling the insulated tank assembly of FIGS. 1A and 1B.

FIG. 4 is a flow diagram of an example method 400 of assembling insulated tank assembly 100. As indicated by a step 402, panels 104 of insulative material may be positioned over substantially the entire outer surface of tank 102. In some examples, outer surface 106 of tank 102 may be prepared by texturizing of outer surface 106. For example, outer surface 106 of tank 102 may be lightly sandblasted (e.g., 60 grain) to create texture to improve adhesion of panels 104 to outer surface 106. In some examples, outer surface 106 of tank 102 may be prepared by applying a cleaning agent, such as an alcohol-based cleaning agent, to remove any dirt, particles, foreign matter, or reside that may prevent or reduce adhesion of panels 104 to outer surface 106. In some examples, outer surface 106 of tank 102 may be prepared by heating tank 102 prior to positioning panels 104 over outer surface 106. For example, tank 102 may be heated or flashed to a temperature above approximately 15.5 degrees Centigrade. In some examples, a layer of adhesive may be applied to outer surface 106 to adhere panels 104 to tank 102. In some examples, panels 104 may include a layer of adhesive material to hold panels 104 in position over outer surface 106, such that the layer of adhesive may be applied by, for example, removing a releasable liner to expose the adhesive.

As indicated by a step 404, seams may be formed by overlapping the panels 104 so that panels 104 extend adjacent to one another. In some examples, seams 108 may be formed by a minimum overlap of approximately 25 millimeters. In some embodiments, a roller may be used to press the seams together to improve adhesion. In some examples, scribe marks or identification lines may be placed or embossed on tank 102 to guide alignment, orientation, and application of panels 104 to tank 102. In some examples, panels 104 may be positioned such that, upon location of insulated tank assembly 100 on a support structure, a seam 108 is in contact with the support structure along the length of the seam 108 to prevent separation of adjacent panels 104 forming the seam 108. In some examples, patches of insulative material may be adhered over seams 108.

Figure 5A:
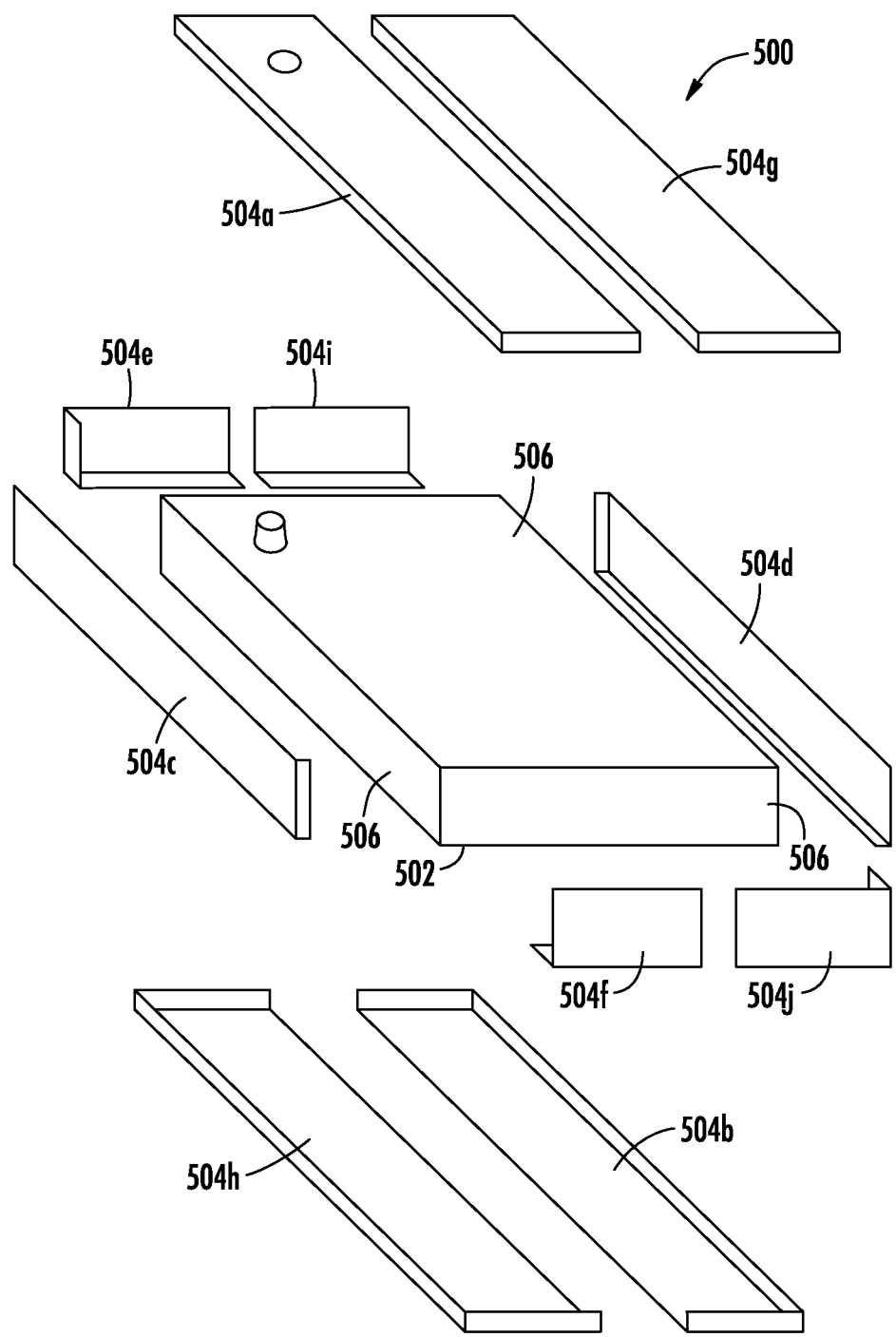
FIG. 5A is an exploded view of an example insulated tank assembly having an expansion joint.
Figure 5B:
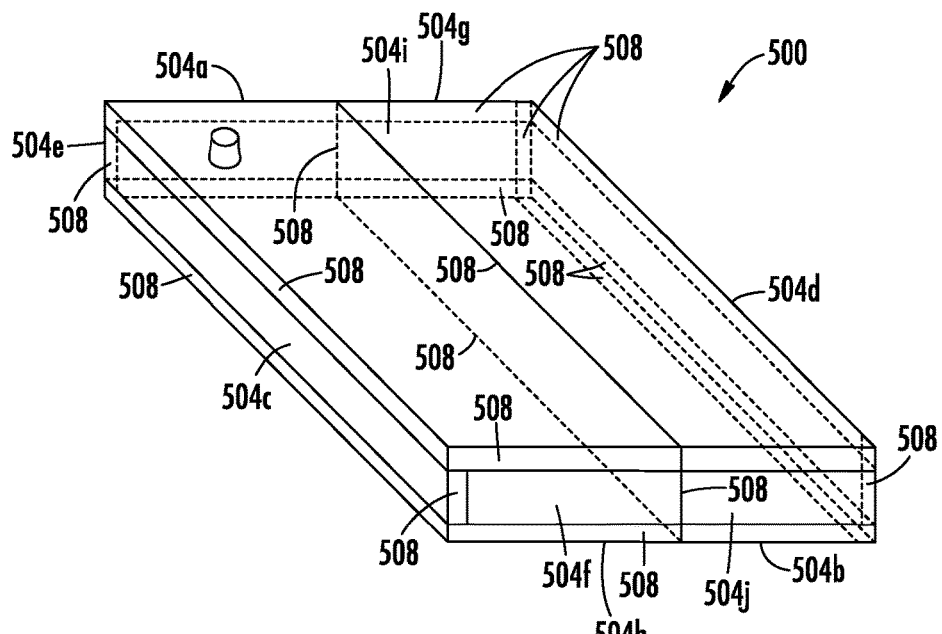
FIG. 5B is a perspective view of the example insulated tank assembly of FIG. 5A.
Figure 5C:
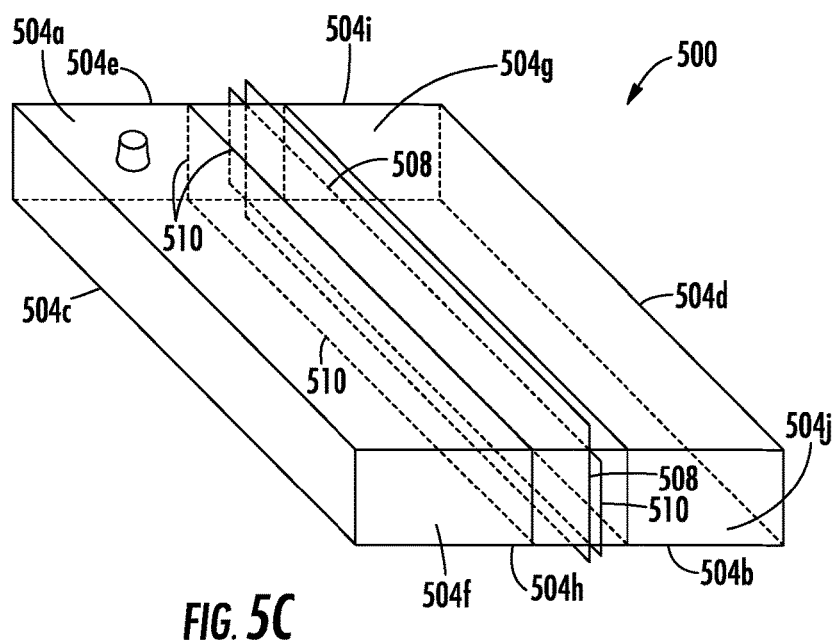
FIG. 5C is another perspective view of the example insulated tank assembly of FIG. 5A showing the expansion joint.

FIGS. 5A, 5B, and 5C illustrate different views of an example insulated tank assembly 500 having an expansion joint 510. In particular, FIG. 5A is an exploded view of insulated tank assembly 500. FIG. 5B is a perspective view of insulated tank assembly 500. FIG. 5C is another perspective view of insulated tank assembly 500 showing expansion joint 510. Insulated tank assembly 500 is similar to insulated tank assembly 100 shown in FIG. 1. For example, insulated tank assembly may include a tank 502 and panels 504 similar to tank 102 and panels 104 shown in and described with reference to FIGS. 1A and 1B. Similarly, tank 502 may have an outer surface 506 similar to outer surface 106 shown in and described with reference to FIGS. 1A and 1B. Panels 504 may be positioned over outer surface 506 of tank 502 such that they extend adjacent to one another to form seams 508. In some examples, panels 504 may be positioned such that, upon location of insulated tank assembly 500 on a support structure, at least one of seams 508 is in contact with the support structure along the length of the seam 508 to prevent separation of the adjacent panels 504 forming the seam. In some examples, patches of an insulative material may be adhered over seams 508 to provide additional protection.

Insulated tank assembly 500 differs from insulated tank assembly 100 in that it may further include expansion joint 510. For example, as shown in FIG. 5B, panels 504a and 504g may extend adjacent to one another to form a seam 508. Panels 504b and 504h may also extend adjacent to one another to form a seam 508. Panels 504e and 504i may extend adjacent to one another to form a seam 508. Panels 504f and 504j may extend adjacent to one another to form a seam 508. Seams 508 formed by these panels may form a continuous seam 508 around tank as shown in FIGS. 5B and 5C. Continuous seam 508 may allow separation between panels 504a and 504g, panels 504b and 504h, panels 504e and 504i, and/or panels 504f and 504j along continuous seem 508 during expansion of tank 502. Expansion joint 510 may be formed between panels 504a and 504g, panels 504b and 504h, panels 504e and 504i, and/or panels 504f and 504j along continuous seem 508. In some examples, expansion joint 510 need not be formed along a continuous seam 508, but rather may be formed along any seam 508 between two panels 504 extending adjacent to each other.

Expansion joint 510 may be formed by, for example, positioning an adhesive strip of material along continuous seam 508. The adhesive strip may be, for example, a single adhesive strip or several sections of adhesive strip. The adhesive strip may be, for example, an insulative material having an adhesive surface, an insulative core, and a layer of heat shielding material, and having an overall thickness of approximately 5 millimeters with a 2 mil protective covering may be used. The adhesive surface may be protected by a releasable liner that may be removed to expose the adhesive.

Expansion joint 510 may include a formed projection or other expandable structure to allow separation of panels 504 along continuous seam 508 during expansion of tank 102. For example, the adhesive strip may include pleats that may expand and become flattened during expansion of tank 102. In some examples, a formed projection or other expandable structure may be integrated with the panels 504 forming continuous seam 508. For example, panels 504a and 504g may be a single panel 504 having a pleat integrated therein that may expand and become flattened during expansion of tank 502.

Figure 6:
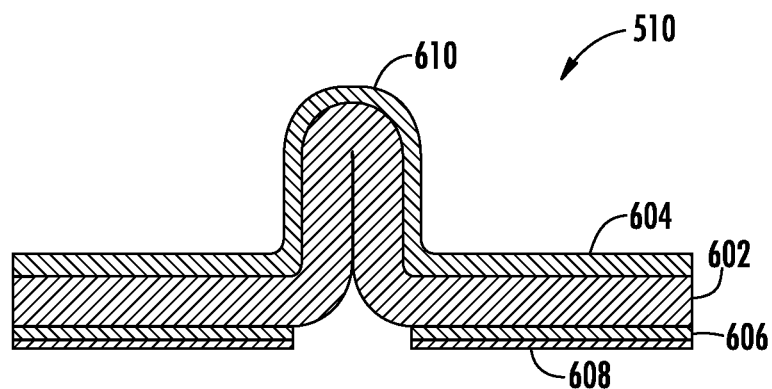
FIG. 6 is a diagram illustrating a cross-section of an example expansion joint that may be used with the insulated tank assembly of FIGS. 5A-5C.

FIG. 6 is a diagram illustrating a cross-section of an example expansion joint 510 that may be used with the insulated tank assembly. Expansion joint 510 may include a layer 602, a layer 604, and a layer 606. In some examples, layer 602 may be a thermally insulative material, layer 604 may be a protective layer composed of a heat shielding material, and layer 606 may be a layer of adhesive. Layers 602, 604, and 606 may be positioned such that when expansion joint 510 is positioned over a seam 508, layer 602 forms an inner core of thermally insulative material, layer 604 forms an outer layer of heat shielding material, and layer 606 forms a layer of adhesive between expansion joint 510 and panels 504. Layers 602, 604, and 606 may be of any suitable thickness depending on the particular example. For example, layer 602 may be a thermally insulative material having a thickness of approximately 4.5 millimeters, layer 604 may be a protective layer composed of a heat shielding material having a thickness of approximately 2 mil, and layer 606 may be a layer of adhesive having a thickness of approximately 0.5 millimeters.

In some examples, layers 602, 604, and 606 may be bonded together as a single unit. For example, layers 602, 604, and 606 may be bonded together to form sheets or rolls from which individual expansion joints 510 may be formed. In some examples, expansion joint 510 may include a releasable liner 608 to cover layer 606 such that the adhesive is protected until releasable liner 608 is removed. In some examples, layers 602 and 604 may be bonded together to form expansion joint 510, and layer 606 may be a layer of adhesive that is separately applied to panels 504 prior to adhering expansion joint 510.

Expansion joint 510 may include a formed projection or other expandable structure 610 to allow separation of panels 504 along continuous seam 508 during expansion of tank 502. For example, as shown in FIG. 6, structure 610 may be a pleat that may expand and become flattened during expansion of tank 502. In some examples, expansion joint 610 may include multiple pleats or other structures. In some embodiments, structure 610 allows for an expansion of tank 502 of approximately 3 percent of linear dimension and/or 3 percent of original volumetric capacity.

Figure 7:
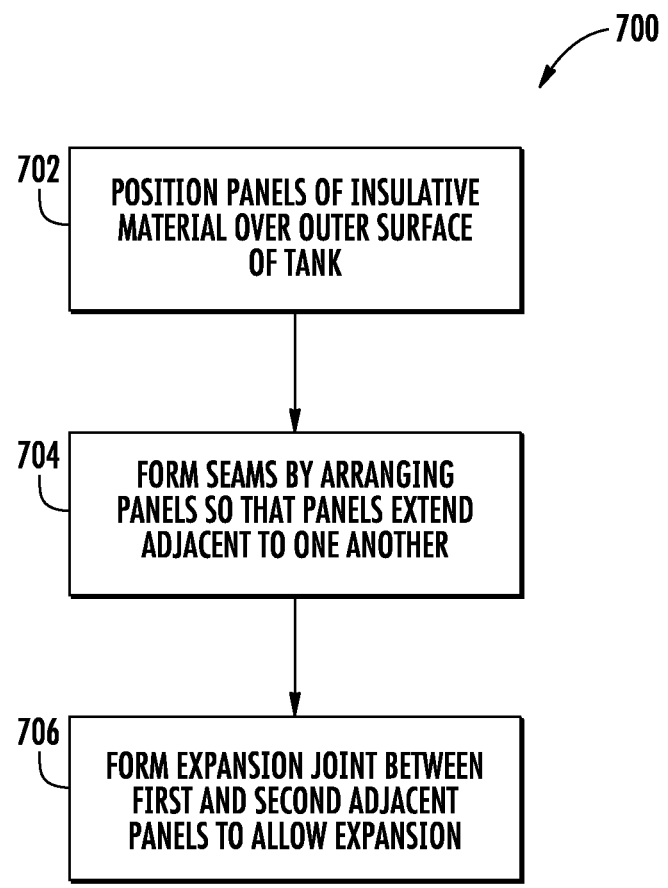
FIG. 7 is a flow diagram of an example method of assembling the insulated tank assembly of FIGS. 5A-5C.

FIG. 7 is a flow diagram of an example method 700 of assembling insulated tank assembly 500. Method 700 is similar to method 400 shown in FIG. 4 in that, as indicated by a step 702, panels 504 of insulative material may be positioned over substantially the entire outer surface of tank 502. Similarly, as indicated by a step 704, seams may be formed by arranging panels 504 so that panels 504 extend adjacent to one another. In some examples, panels 504 may be positioned such that, upon location of insulated tank assembly 500 on a support structure, a seam 508 is in contact with the support structure along the length of the seam 508 to prevent separation of adjacent panels 504 forming the seam 508. In some examples, patches of insulative material may be adhered over seams 508.

Method 700 differs from method 400 in that, as indicated by a step 706, an expansion joint 510 may be formed between at least two adjacent panels 504 to allow expansion of tank 502. Expansion joint 510 may be formed by, for example, positioning an adhesive strip of material along a continuous seam 508. The adhesive strip may be, for example, a single adhesive strip or several sections of adhesive strip. The adhesive strip may be, for example, an insulative material having an adhesive surface, an insulative core, and a layer of heat shielding material. Expansion joint 510 may include a formed projection or other expandable structure to allow separation of panels 504 along continuous seam 508 during expansion of tank 502. For example, the adhesive strip may include pleats that may expand and become flattened during expansion of tank 502. In some examples, a formed projection or other expandable structure may be integrated with the panels 504 forming continuous seam 508.

Figure 8A:
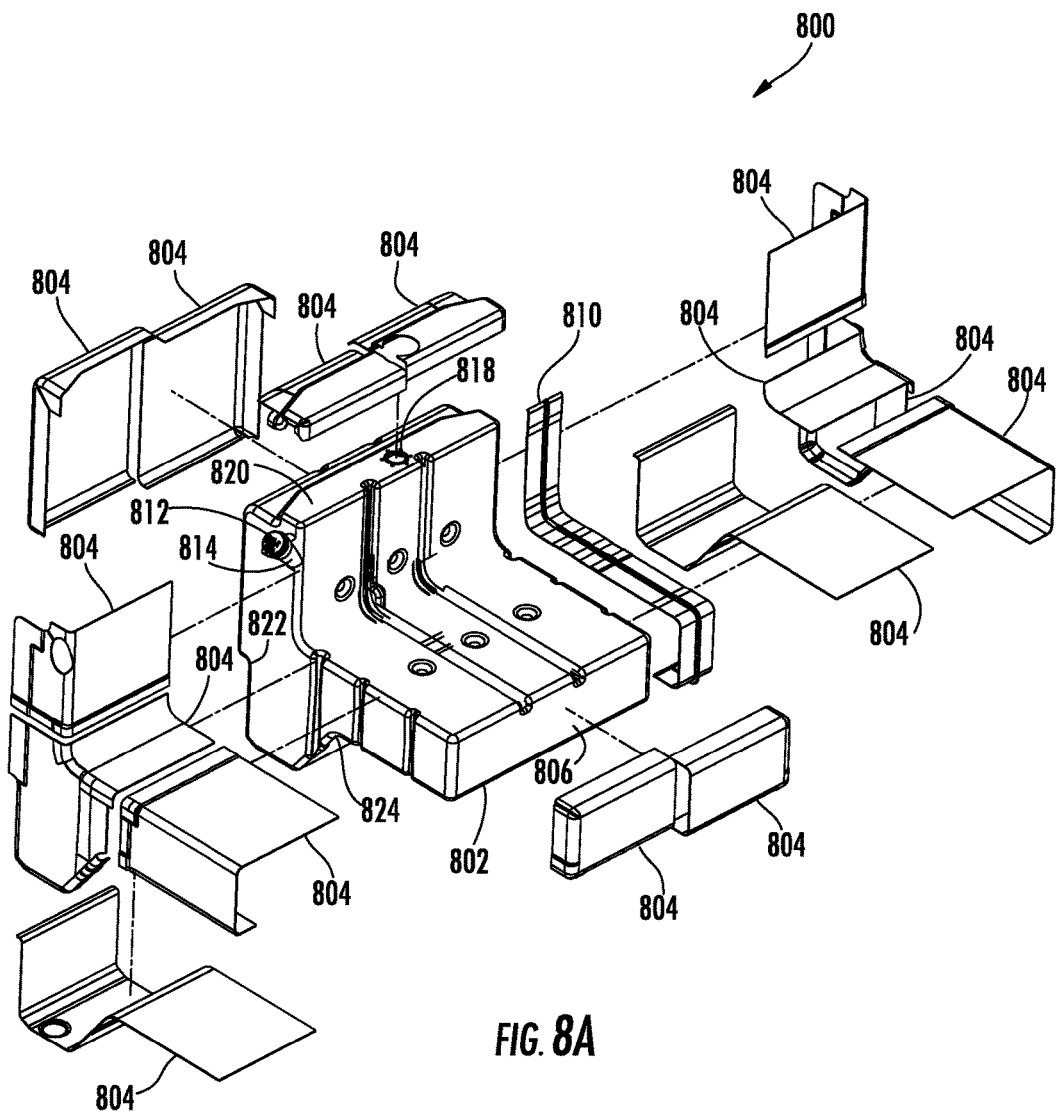
FIG. 8A is an exploded view of another example insulated tank assembly.

FIGS. 8A-8D illustrate different views of an example insulated tank assembly 800. In particular, FIG. 8A is an exploded view of insulated tank assembly, while FIGS. 8B-8D provide different perspective views of insulated tank assembly 800. Insulated tank assembly 800 is similar to insulated tank assemblies 100 and 500, but includes a tank 802 having a more complex geometry. Tank 802 may be, for example a plastic diesel fuel tank for a harvester having a fluid capacity of approximately 13.5 gallons. Insulated tank assembly 800 may also include panels 804. Tank 802 may have an outer surface 806. Panels 804 may be positioned over substantially the entire outer surface 806 of tank 802 and may extend adjacent to one another to form seams 808.

As shown in FIGS. 8A-8D, tank 802 may include an opening 812 and other surrounding structure, such as a fill neck 814 for permitting fluids to enter. Tank 802 may also include openings to accommodate a drain valve 816, as well as for sending units and return lines 818 (e.g., for sensing fuel levels, etc.). Tank 802 may have more complex geometries (e.g., 820, 822, and 824) to accommodate surrounding structure and components, as well as to allow for expansion of fluids or vapor (e.g., diesel fuel vapor) inside tank 802. As shown in FIGS. 8A-8D, tank 802 may have rounded or chamfered edges (e.g., to facilitate a plastic molding process). In some examples, tank 802 may have walls of uniform or varying thicknesses, internal or external ribs, or other structures designed (e.g., using a finite element analysis) to strengthen tank 802 and minimize tank expansion. In some examples, outer surface 806 may be designed to simply positioning of panels 804.

Panels 804 may be similar to panels 104 and 504. For example, panels 804 may be made of any insulative material suitable for protecting tank 802 from heat sources and combustible materials. For example, panels 806 may be made from a thermally insulative material that may be made to conform to outer surface 806 such that no gaps or spaces exist between panels 804 and outer surface 806. In some examples, panels 804 may be multilayered in structure. For example, panels 804 may include a protective layer composed of a heat shielding material, such as foils and/or sheets made of aluminum or another metal, alloy or other durable material. In some examples, panels 804 may include a layer of adhesive material to hold panels 804 in position over outer surface 806. In some examples, the adhesive may be an adhesive such as HPA1905 that may provide resistance to fuels, hydraulic oil, engine oil, solvents, etc.

Panels 804 may designed to be different sizes and shapes such that, when positioned over outer surface 806 of tank 802, panels 804 cover substantially the entire outer surface of tank 802 with minimal gaps and/or spaces between panels 104 and outer surface 806 of tank 802. For example, as shown in FIGS. 8A-8D, tank 802 may include surfaces and/or structures such as a fill neck 814, drain 816, and sending units and return lines 818 for sensing fuel levels, etc. which may need to remain accessible. Panels 818 may be designed so that such surfaces and/or structure may remain minimally exposed. In some examples, other minimal surfaces and/or structures of tank 802 may remain exposed. As shown in FIGS. 8A-8D, 14 panels 804 may be used in insulated fuel tank assembly 800 to cover substantially the entire outer surface 806 of tank 802. Panels 804 may be positioned over outer surface 806 of tank 802 such that they extend adjacent to one another to form seams 808. As shown in FIGS. 8A-8D, seams 808 may be formed by overlapping surfaces of adjacent panels 804. In some examples, seams 808 may be formed by a minimum overlap of approximately 25 millimeters.

Figure 9:
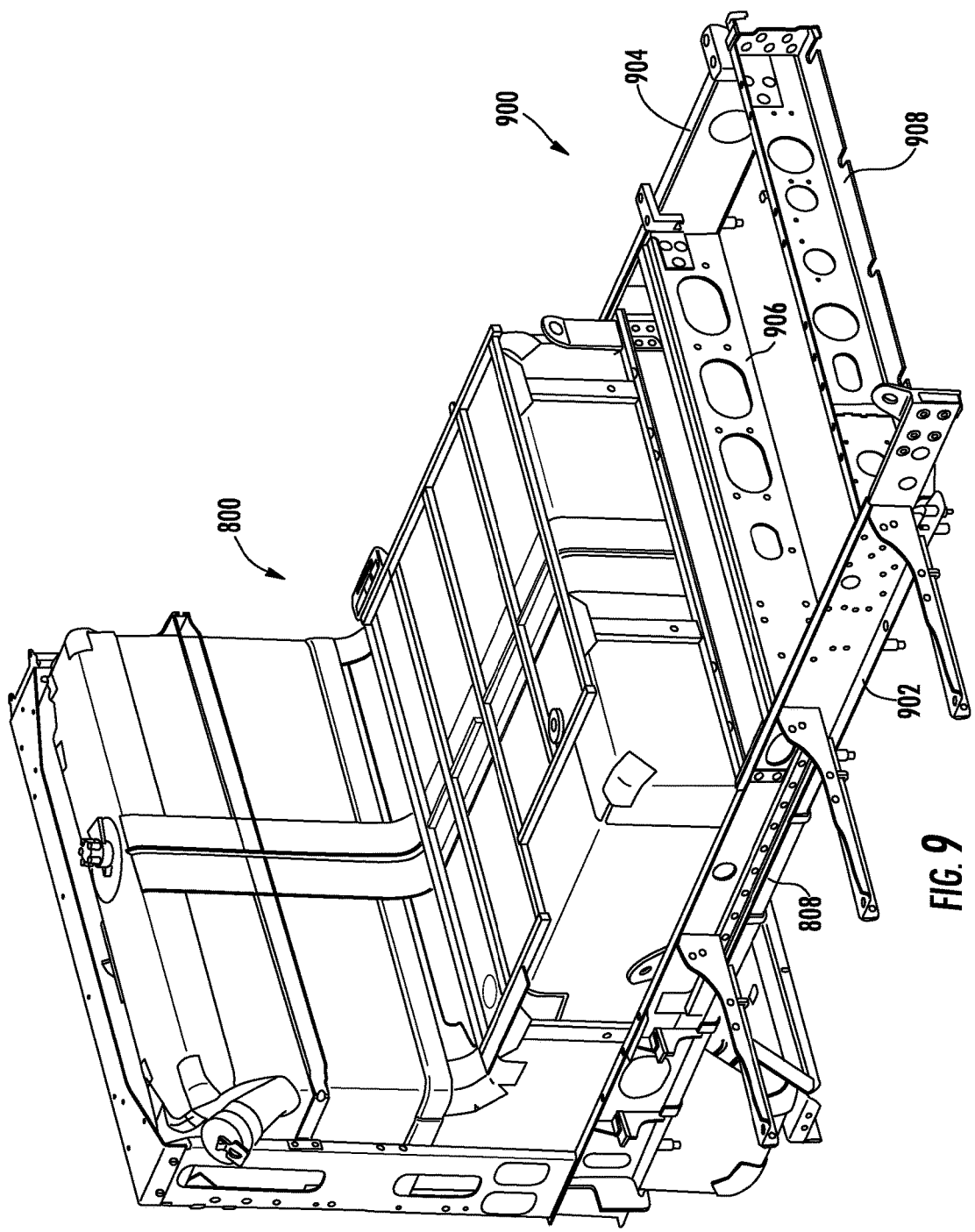
FIG. 9 is a perspective view of the insulated tank assembly of FIGS. 8A-8D positioned within a support structure.

Panels 804 may be positioned such that, upon location of insulated tank assembly 800 on a support structure, at least one of seams 808 is in contact with the support structure along the length of the seam 808 to prevent separation of the adjacent panels 804 forming the seam. For example, FIG. 9 is perspective view of insulated tank assembly 800 shown with respect to a support structure 900 having rails 902 and 904 and cross members 906 and 908. Upon location of insulated tank assembly 800 on support structure 900, seams 808 formed along adjacent panels 804 (shown, for example, in FIG. 8C) may be in contact with rails 902 and 904. The weight of insulated tank assembly 800 resting upon rails 902 and 904 may prevent the respective seams 808 from separating. Rails 902 and 904 may also cooperate with cross members 906 and 908 to prevent and/or redirect expansion of tank 802 in areas along seams 808 in contact with rails 902 and 904.

As best shown in FIG. 8B, patches 826 of an insulative material may be adhered over seams 808 to provide additional protection. For example, patches 826 of an insulative material may be used to protect seams 808 formed adjacent to complex geometric features of tank 802. Patches 826 of insulative material may also be adhered over seems 808 forming a corner or other intersections of seems 808. The patches may be, for example, patches of thermally insulative tape.

As shown in FIGS. 8A-8D, insulated tank assembly 800 may further include expansion joint 810 formed along a continuous seam 808. Expansion joint 810 may be formed by, for example, positioning an adhesive strip of material along continuous seam 808. The adhesive strip may be, for example, a single adhesive strip or several sections of adhesive strip. The adhesive strip may be, for example, an insulative material having an adhesive surface, an insulative core, and a layer of heat shielding material. As shown in FIGS. 8A-8D, expansion joint 810 may include a formed projection or other expandable structure 828 to allow separation of panels 804 along continuous seam 808 during expansion of tank 802. For example, the adhesive strip may include pleats that may expand and become flattened during expansion of tank 802.

Figure 10:
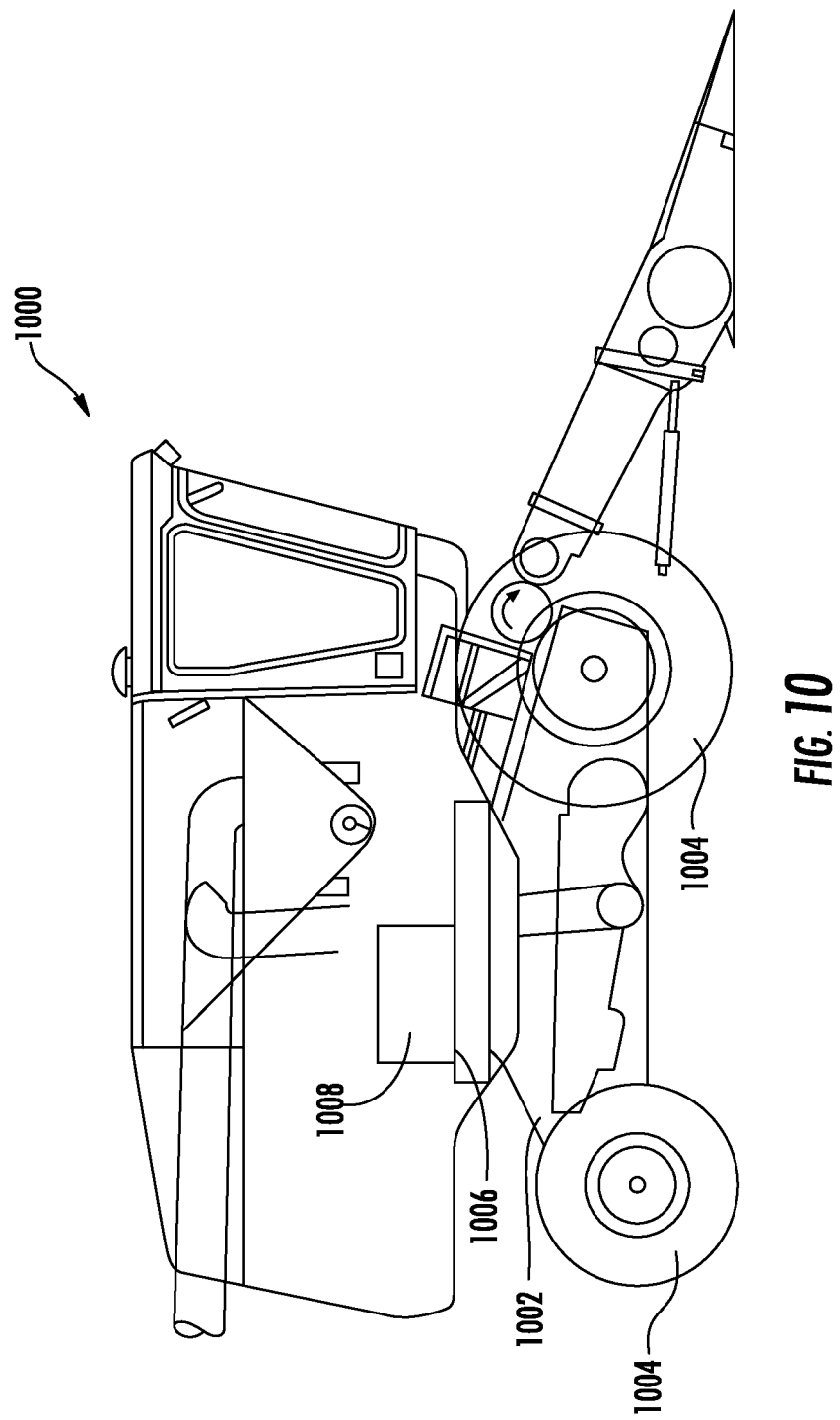
FIG. 10 is a diagram of an example harvester including an insulated tank assembly.

FIG. 10 is a diagram of an example harvester 1000 including an insulated tank assembly. Harvester 1000 may include a chassis 1002 which is supported and propelled by ground engaging members 1004. Although harvester 1000 is illustrated as being supported and propelled on ground engaging wheels 1004 it can also be supported and propelled by full tracks or half-tracks. Harvester 1000 may also include a tank support structure 1006 supported by chassis 1002, and an insulated tank assembly 1008 located on tank support structure 1006. Tank support structure 1006 may be similar to tank support structure 300 and/or 900. Insulated tank assembly 1008 may be similar to insulated tank assemblies 100, 500, and/or 800.

While the examples of the invention have been illustrated and described, it will be appreciated that various changes can be made therein without departing from the spirit and scope of the invention. For example, although different examples may have been described as including one or more features providing one or more benefits, it is contemplated that the described features may be interchanged with one another or alternatively be combined with one another in the described examples or in other examples. One of skill in the art will understand that the invention may also be practiced without many of the details described above. Accordingly, it will be intended to include all such alternatives, modifications and variations set forth within the spirit and scope of the appended claims. Further, some well-known structures or functions may not be shown or described in detail because such structures or functions would be known to one skilled in the art. Unless a term is specifically and overtly defined in this specification, the terminology used in the present specification is intended to be interpreted in its broadest reasonable manner, even though may be used in conjunction with the description of certain specific examples of the present invention.

What is claimed is:

1. An apparatus, comprising:
a tank having an outer surface and tank corners; and
panels of insulative material, the panels positioned over substantially the entire outer surface of the tank and extending adjacent to one another to form seams extending parallel to and along the tank corners, wherein the panels have edges corresponding to a thickness of the panels and faces that confront, face and extend opposite to corresponding portions of the outer surface of the tank, the panels comprising:
a first multidimensional panel, wherein the faces of the first multidimensional panel are joined at first panel corners; and
a second multidimensional panel, wherein the faces of the second multidimensional panel are joined at second panel corners, wherein the first panel corners and the second panel corners extend parallel to and along the tank corners, wherein the faces of the first multidimensional panel and the faces of the second multidimensional panel directly contact one another and overlap one another in multiple non-parallel planes.

2. The apparatus of claim 1, wherein the panels are positioned such that, upon location of the tank on a support structure, at least one of the seams is in contact with the support structure along the length of the seam to prevent separation of the adjacent panels forming the seam.

3. The apparatus of claim 1, wherein the tank is a plastic fuel tank.

4. The apparatus of claim 1, further comprising a layer of adhesive between the panels and the outer surface of the tank.

5. The apparatus of claim 1, wherein the panels include a layer of metallic foil adjacent to a layer of thermally insulative material.

6. The apparatus of claim 1, further comprising patches of insulative material adhered over the seams.

7. The apparatus of claim 1, wherein a first one of the faces of the first multidimensional panel overlaps a first one of the faces of the second multidimensional panel in a first plane and wherein a second one of the faces of the first multidimensional panel overlaps a second one of the faces of the second multidimensional panel in a second plane perpendicular to the first plane.

8. The apparatus of claim 7, wherein a third one of the faces of the first multidimensional panel overlaps one of the edges of the second multidimensional panel.

9. The apparatus of claim 1, wherein the panels comprise a third multidimensional panel overlapping one of the faces of the first multidimensional panel and one of the faces of the second multidimensional panel.

10. A method, comprising:
positioning panels of insulative material over substantially an entire outer surface of a tank having tank corners; and
forming seams by overlapping the panels so that the panels extend adjacent to one another, the seams extending parallel to and along the tank corners, wherein the panels have edges corresponding to a thickness of the panels and faces that confront, face and extend opposite to corresponding portions of the outer surface of the tank, the panels comprising a first multidimensional panel and a second multidimensional panel, wherein the first multidimensional panel and the second multidimensional panel are overlapped such that faces of the first multidimensional panel and the faces of the second multidimensional panel overlap one another in multiple non-parallel planes and wherein the panels comprise:
a first multidimensional panel, wherein the faces of the first multidimensional panel are joined at first panel corners; and
a second multidimensional panel, wherein the faces of the second multidimensional panel are joined at second panel corners, wherein the first panel corners and the second panel corners extend parallel to and along the tank corners, wherein the faces of the first multidimensional panel and the faces of the second multidimensional panel directly contact one another and overlap one another in multiple non-parallel planes.

11. The method of claim 10, further comprising positioning the panels such that, upon location of the tank on a support structure, at least one of the seams is in contact with the support structure along the length of the seam to prevent separation of the adjacent panels forming the seam.

12. The method of claim 10, further comprising heating the tank prior to positioning the panels over the outer surface, wherein the tank comprises a completed three-dimensional tank prior to the heating of the tank.

13. The method of claim 10, further comprising applying an adhesive to the outer surface of the tank to adhere the panels to the tank.

14. The method of claim 10, wherein the tank is a plastic fuel tank, and wherein the panels include a layer of metallic foil adjacent to a layer of thermally insulative material.

15. The method of claim 10, further comprising adhering patches of insulative material over the seams.

16. A vehicle, comprising:
   a chassis supported and propelled by ground engaging members;
   a tank support structure supported by the chassis; and
   a tank located on the tank support structure, the tank having an outer surface and panels of insulative material positioned over the outer surface of the tank and extending adjacent to one another to form seams, at least one of the seams in direct contact with the tank support structure along a length of the at least one seam to prevent separation of the adjacent panels forming the at least one seam.

17. The vehicle of claim 16, wherein the at least one seam is in contact with a member of the tank support structure that is positioned to support the weight of the tank along the length of the at least one seam.

18. The vehicle of claim 16, wherein the at least one seam is in contact with a member of the tank support structure that is positioned to prevent expansion of the tank.

19. The vehicle of claim 16, wherein the tank has tank corners, wherein the seams are formed by overlapping surfaces of the panels extend parallel to and along the tank corners, wherein the panels have edges corresponding to a thickness of the panels and faces that confront and extend opposite to corresponding portions of the outer surface of the tank, the panels comprising:
   a first multidimensional panel; and
   a second multidimensional panel, wherein the faces of the second multidimensional panel are joined at second panel corners, wherein the first panel corners and the second panel corners extend parallel to and along the tank corners, wherein the faces of the first multidimensional panel and the faces of the second multidimensional panel directly contact one another and directly overlap one another in multiple non-parallel planes.

20. The vehicle of claim 16, wherein the vehicle is a harvester, and wherein the tank is a plastic fuel tank.

21. The vehicle of claim 16, wherein the panels include a layer of metallic foil adjacent to a layer of thermally insulative material, and a layer of adhesive adjacent to the layer of thermally insulative material.

* * * * *